(12) United States Patent
Nam

(10) Patent No.: US 8,138,994 B2
(45) Date of Patent: Mar. 20, 2012

(54) PLASMA DISPLAY AND DRIVING METHOD THEREOF

(75) Inventor: Jin-Won Nam, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 974 days.

(21) Appl. No.: 12/153,531

(22) Filed: May 20, 2008

(65) Prior Publication Data

US 2008/0291131 A1    Nov. 27, 2008

(30) Foreign Application Priority Data

May 25, 2007  (KR) .................. 10-2007-0050854

(51) Int. Cl.
*G09G 3/28* (2006.01)

(52) U.S. Cl. ........................................................ 345/60

(58) Field of Classification Search .............. 345/60–72, 345/204–215, 690–699; 315/169.1–169.4
See application file for complete search history.

(56) References Cited

U.S. PATENT DOCUMENTS

| 6,630,940 | B2 * | 10/2003 | Sako ............................ 345/690 |
| 7,088,312 | B2 * | 8/2006 | Ishizuka et al. ................. 345/60 |
| 2004/0101552 | A1 * | 5/2004 | Patel ............................ 424/450 |
| 2005/0068286 | A1 * | 3/2005 | Morita .......................... 345/100 |
| 2005/0201552 | A1 * | 9/2005 | Arisawa et al. ................. 380/28 |
| 2006/0055687 | A1 * | 3/2006 | Sheu et al. .................... 345/204 |
| 2006/0220992 | A1 * | 10/2006 | Tanaka et al. .................. 345/60 |

FOREIGN PATENT DOCUMENTS

| KR | 10-2005-0102845 | 10/2005 |
| KR | 1020050102845 A * | 10/2005 |
| KR | 10-2006-0006669 | 1/2006 |

\* cited by examiner

*Primary Examiner* — Alexander Eisen
*Assistant Examiner* — Patrick F Marinelli
(74) *Attorney, Agent, or Firm* — Robert E. Bushnell, Esq.

(57) ABSTRACT

In a plasma display, an address buffer board converts subfield data, transmitted by a differential method, into a driving voltage using a control signal transmitted by a Transistor-Transistor Logic (TTL) method and a clock signal, transmitted by a differential method, and supplies the driving voltage to an address electrode. The signal transmitted by the TTL method passes through a buffer, and the buffer has a delay value that varies depending on temperature. A controller delays a clock signal corresponding to delay value of the buffer, and generates a control signal from the delayed clock signal. In addition, the controller converts the generated control signal into a control signal of the TTL method and outputs the converted control signal to the address buffer board.

13 Claims, 7 Drawing Sheets

_US 8,138,994 B2_

PLASMA DISPLAY AND DRIVING METHOD THEREOF

CLAIM OF PRIORITY

This application makes reference to, incorporates the same herein, and claims all benefits accruing under 35 U.S.C. §119 from an application for PLASMA DISPLAY AND DRIVING METHOD THEREOF earlier filed in the Korean Intellectual Property Office on the 25th of May 2007 and there duly assigned Serial No. 10-2007-0050854.

BACKGROUND OF THE INVENTION

1. Field of the Invention

The present invention relates to a plasma display and a driving method thereof.

2. Description of the Related Art

A plasma display is a flat panel display that uses a plasma generated by a gas discharge to display characters or images. One frame of such a plasma display is divided into a plurality of subfields having weight values. A light emitting cell and a non-light emitting cell are selected during an address period of each subfield, and a sustain discharge is performed on the light emitting cell to display an image during a sustain period. Grayscales are expressed by a combination of weights of subfields in which the corresponding cells emit light.

In order to display an image, the plasma display requires many transmission lines for transmitting data from a control board to a driving board, and a large amount of ElectroMagnetic Interference (EMI) may be generated from the transmission lines. A differential method, such as using a Reduced Swing Differential Signal (RSDS) has been introduced to prevent the EMI. Therefore, the plasma display uses the differential method of transmitting data with a high signal level, and uses a Transistor-Transistor Logic (TTL) method of transmitting data with a low signal level. A signal transmitted through the TTL method is transmitted to a driving circuit through a buffer in order to prevent a signal level loss due to a distance of the transmission line. However, the buffer has a delay value that delays the signal, and the delay value has a characteristic of being changed according to temperature. When the delay value is increased due to temperature so that a control signal is output late, data is also output late, and therefore image data input during one frame cannot be displayed on a plasma display panel within a predetermined time period. That is, data may be mismatched due to a delay value of the buffer, which varies depending on temperature.

SUMMARY OF THE INVENTION

The present invention has been made in an effort to provide a plasma display having an advantage of preventing data from being mismatched due to temperature, and a driving method thereof.

An exemplary plasma display according to one embodiment of the present invention includes an address electrode, an address driving circuit, a buffer, and a controller. The address driving circuit is connected to the address electrode. The buffer is connected to the address driving circuit and has a delay value corresponding to a temperature of the plasma display. The controller outputs a second clock signal in which a first clock signal is delayed for a predetermined time, generates a control signal using the second clock signal, outputting the control signal to the address driving circuit through the buffer, and outputs a subfield data corresponding to a video data input during a frame and the first clock signal to the address driving circuit. At this time, the address driving circuit applies a driving voltage corresponding to the subfield data using the first clock signal and the control signal to the address electrode.

An exemplary method according to another embodiment of the present invention drives a plasma display having a driving integrated circuit connected to a plurality of electrodes. The method includes: generating subfield data using image data input a frame; generating a second clock signal in which a first clock signal is delayed for a predetermined time corresponding to a temperature of the plasma display, and, and outputting the second clock signal; generating a control signal using the second clock signal; outputting the control signal to the driving integrated circuit through a buffer having a delay value corresponding to the temperature of the plasma display; and outputting the subfield data to the driving integrated circuit using the control signal and the first clock signal.

BRIEF DESCRIPTION OF THE DRAWINGS

A more complete appreciation of the present invention and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive.

Throughout this specification and the claims that follow, unless explicitly described to the contrary, the word "comprise" and variations such as "comprises" or "comprising" will be understood to imply the inclusion of stated elements but not the exclusion of any other elements.

A plasma display and a driving method thereof according to an exemplary embodiment of the present invention is described in further detail below with reference to the accompanying drawings.

Figure 1:
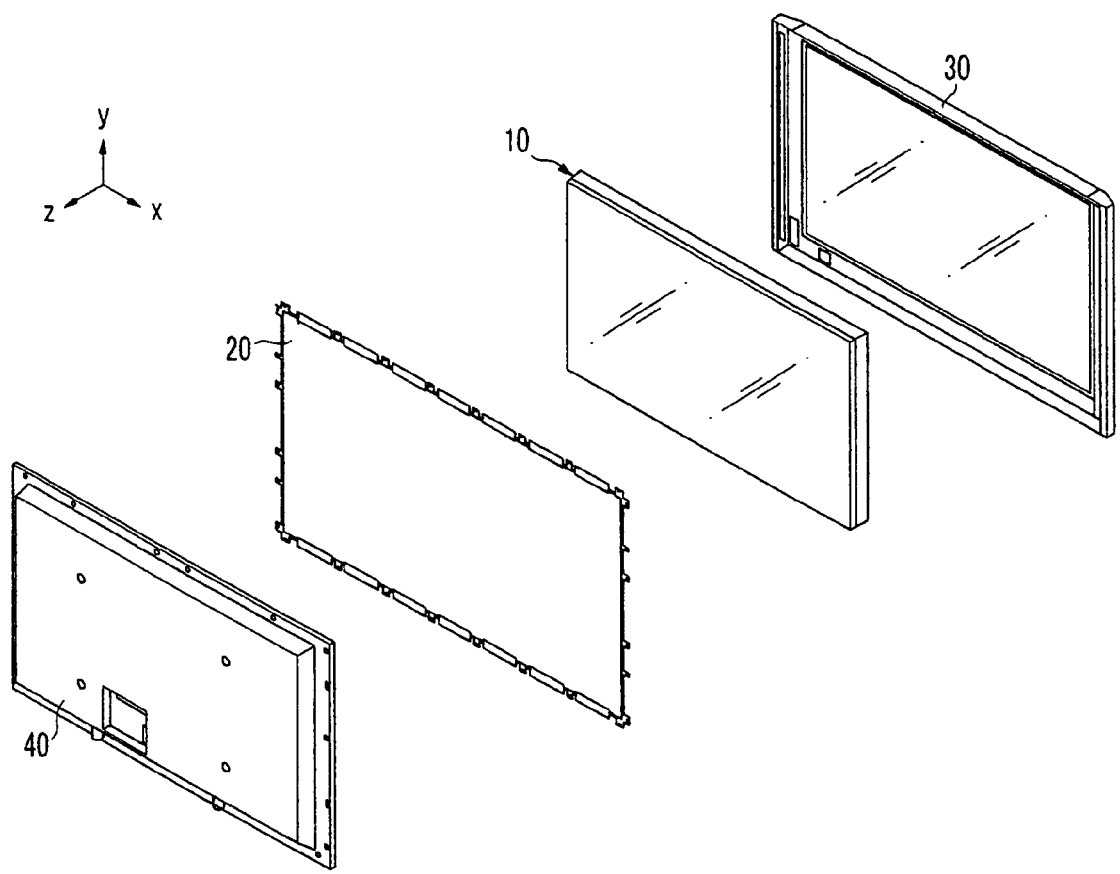
FIG. 1 is an exploded perspective view of a plasma display according to an exemplary embodiment of the present invention.
Figure 2:
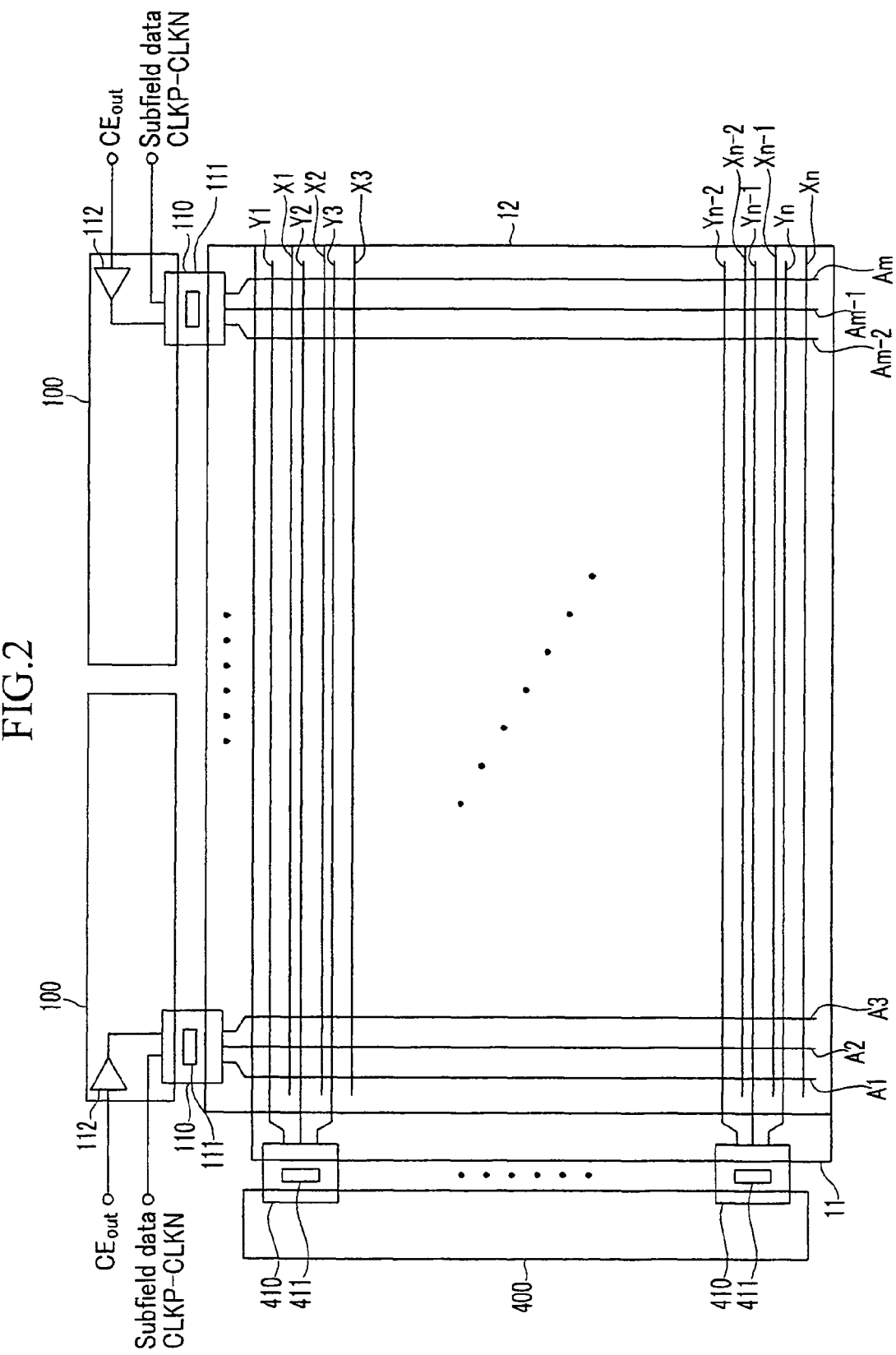
FIG. 2 is a partial top plan view of the plasma display according to the exemplary embodiment of the present invention.
Figure 3:
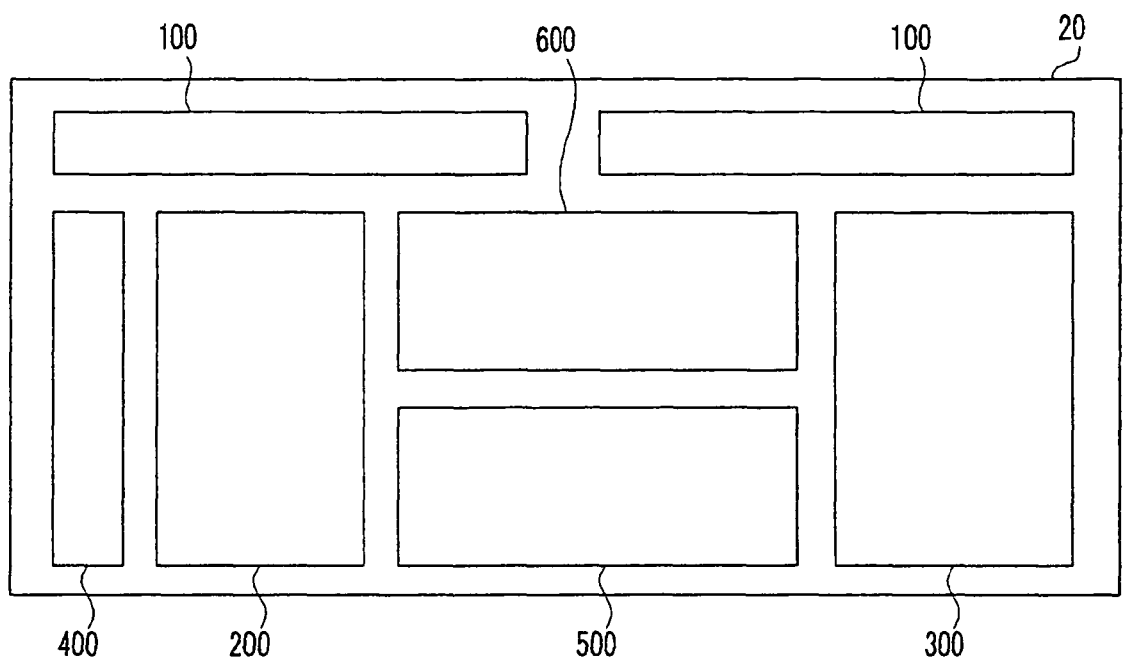
FIG. 3 is a top plan view of a chassis base according to the exemplary embodiment of the present invention.

FIG. 1 is an exploded perspective view of a plasma display according to an exemplary embodiment of the present invention, and FIG. 2 is a partial top plan view of the plasma display according to the exemplary embodiment of the present invention. FIG. 3 is a top plan view of a chassis base according to the exemplary embodiment of the present invention.

As shown in FIG. 1, the plasma display includes a Plasma Display Panel (PDP) 10, a chassis base 20, a front case 30, and a rear case 40. The chassis base 20 is attached to the PDP 10, being disposed opposite to an image display side of the PDP 10. While being respectively disposed to the front of the PDP 10 and the rear of the chassis base 20, the front and rear cases 30 and 40 are attached to the PDP 10 and the chassis base 20 to form a plasma display.

As shown in FIG. 2, the PDP 10 includes a plurality of address electrodes (hereinafter referred to as A electrodes) A1 to Am extending in a column direction, and a plurality of sustain electrodes (hereinafter referred to as X electrodes) X1 to Xn and a plurality of scan electrodes (hereinafter referred to as Y electrodes) Y1 to Yn extending in a row direction. The X electrodes X1 to Xn are formed in correspondence with the Y electrodes Y1 to Yn. The PDP 10 may include a substrate 11 in which the X and Y electrodes X1 to Xn and Y1 to Yn are arranged and a substrate 12 in which the A electrodes A1 to Am are arranged. The two substrates 11 and 12 may be placed facing each other with a discharge space formed therebetween so that the Y electrodes Y1 to Yn and the A electrodes A1 to Am perpendicularly cross each other and the X electrodes X1 to Xn and A electrodes A1 to Am perpendicularly cross each other. The discharge space formed at a crossing region of the A electrodes A1 to Am and the X and Y electrodes X1 to Xn and Y1 to Yn forms a discharge cell.

As shown in FIG. 3, driving boards 200 and 300 for driving the PDP 10 are arranged on the chassis base 20, and address buffer boards 100, located in upper or lower portions of the chassis base 20, may be formed as a single board or a plurality of boards. It is notable that FIG. 3 exemplarily illustrates a plasma display driven by a single driving method. In the case of a plasma display driven by a duel driving method, the address buffer board 100 is disposed at either of the upper and lower portions of the chassis base 20. Such an address buffer board 100 receives a control signal from a controlling board 500 and supplies the control signal to the A electrodes A1 to Am.

Scan and sustain driving boards 200 and 300 are respectively disposed to the left and right on the chassis base 20, and the scan driving board 200 is electrically coupled to the Y electrodes Y1 to Yn through a scan buffer board 400. The scan buffer board 400 performs an operation for sequentially scanning the Y electrodes Y1 to Yn during an address period, and the scan driving board 200 receives a control signal from the controlling board 500 and supplies a driving voltage to the Y electrodes Y1 to Yn. The sustain driving board 300 receives a control signal from the controlling board 500 and supplies a driving voltage to the X electrodes X1 to Xn. In FIG. 3, the scan and sustain driving boards 200 and 300 are shown to be separately disposed, but they may be formed as one board, and the scan buffer board 400 may be integrally formed with the scan driving board 200.

The controlling board 500 receives an external video signal, and respectively supplies an A electrode driving control signal, an X electrode driving control signal, and a Y electrode driving control signal to the address buffer board 100, the scan driving board 200, and the sustain driving board 300.

A power supply board 600 supplies power for driving the plasma display. The controlling board 500 and the power supply board 600 may be disposed at a center portion of the chassis base 20.

Referring back to FIG. 2, packaging connection members 110, such as a Tape Carrier Package (TCP) are mounted on the substrate 12 and the address buffer board 100, and an A driving integrated circuit 111 is mounted on the packaging connection member 110 in the form of a chip. In addition, a plurality of lead lines (not shown) for connecting the A driving integrated circuit 111 and the A electrodes A1 to Am are formed in the packaging connection member 110. A buffer 112 is mounted on the address buffer board 100, and the buffer 112 receives and stores a control signal such as a chip enable signal $CE_{OUT}$ output as a TTL signal from the controlling board 500, and outputs the control signal to the A driving integrated circuit 111. In FIG. 2, only the chip enable signal $CE_{OUT}$ is illustrated as the control signal. The A driving integrated circuit 111 receives a clock signal CLKP-CLKN and subfield data and supplies a driving voltage that corresponds to the subfield data to the A electrodes A1 to Am. The clock signal CLKP-CLKN is a differential signal of a chip enable signal $CE_{OUT}$ and a Reduced Swing Differential Signaling (RSDS) signal.

Connection members 410, such as Flexible Printed Circuits (FPCs) are mounted on the substrate 12 and the scan buffer board 400, and a Y driving integrated circuit 411 is mounted on the connection member 410 in the form of a chip. A plurality of lead lines (now shown) for connecting the Y driving integrated circuit 411 and the Y electrodes Y electrodes Y1 to Yn are formed in the connection member 410.

The packaging connection member 110 and the connection member 410 are respectively attached to the address buffer board 100 and the scan buffer board 400 and electrically coupled thereto, and the packaging connection member 110 and the connection member 410 are attached to the substrates 11 and 12 and electrically coupled thereto and thus the A electrodes A1 to Am and the Y electrodes Y1 to Yn are electrically coupled.

Figure 4:
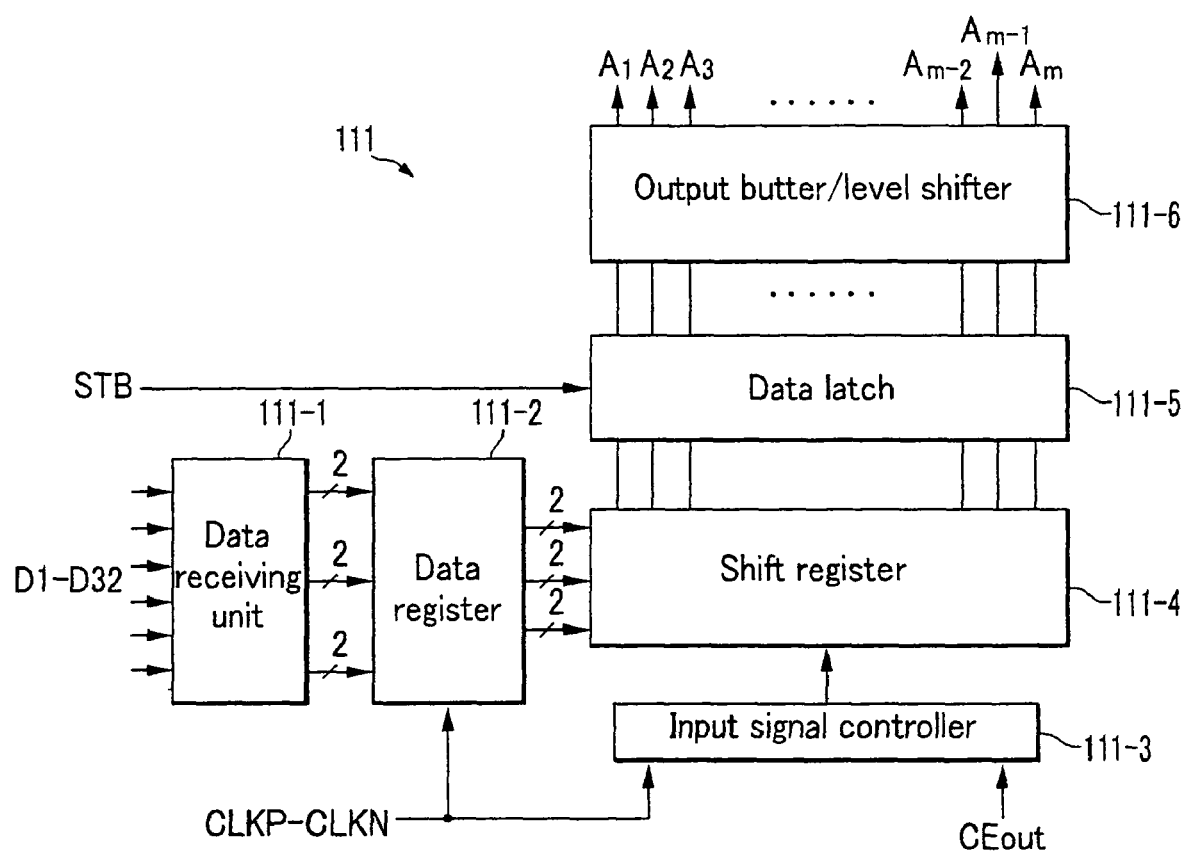
FIG. 4 is a block diagram of an A driving integrated circuit of FIG. 2.

FIG. 4 is a block diagram of the A driving integrated circuit 111 of FIG. 2.

As shown in FIG. 4, the A driving integrated circuit 111 includes a data receiving unit 111-1, a data register 111-2, an input signal controller 111-3, a shift register 111-4, a data latch 111-5, and an output buffer/level shifter 111-6.

The data receiving unit 111-1 receives subfield data D1 to D32 transmitted as a differential signal from the controlling board 500, converts the subfield data D1 to D32 to an original signal, and outputs the converted signal to the data register 111-2.

The data register 111-2 stores the subfield data output from the data receiving unit 111-1, and outputs the subfield data to the shift register 111-4 in synchronization with a clock signal CLKP-CLKN received from the controlling board 500.

The input signal controller 111-3 receives the chip enable signal $CE_{OUT}$ and the clock signal CLKP-CLKN output from the control board 500 and outputs the same to the shift register 111-4.

The shift register 111-4 synchronizes the subfield data output from the data register 111-2 to the chip enable signal $CE_{OUT}$ and the clock signal CLKP-CLKN output from the input signal controller 111-3, sequentially shifts the synchronized signals, and outputs a shifting result to the data latch 111-5.

The data latch 111-5 stores the subfield data output from the shift register 111-4, and outputs the subfield data to the output buffer/level shifter 111-6 in synchronization with a strobe (STB) signal.

The output buffer/level shifter 111-6 level-shifts the subfield data output from the data latch 111-5 with a corresponding driving voltage, and then outputs a level-shifting result to the A electrodes A1 to Am.

In this case, the controlling board 500 converts the clock signal CLKP-CLKN and the subfield data D1 to D32 into differential signals and outputs the converted signals to the A driving integrated circuit 111, and converts the control signals, such as the chip enable signal $CE_{OUT}$ and the STB signal, into TTL signals and outputs the converted signals to the buffer 112 in the address buffer board (100 of FIG. 3).

Hereinafter, a method of preventing a subfield data mismatch due to a delay value of a buffer according to temperature according to the exemplary embodiment of the present invention is described in further detail with reference to FIG. 5 to FIG. 8.

Figure 5:
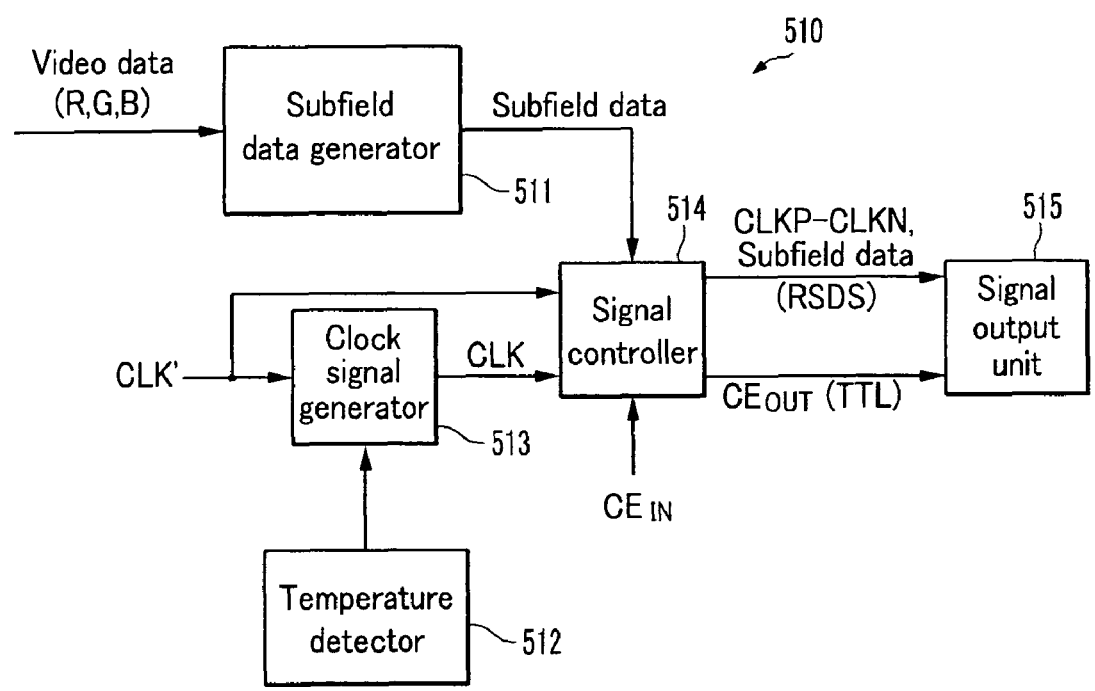
FIG. 5 is a block diagram of a controller according to the exemplary embodiment of the present invention.
Figure 6:
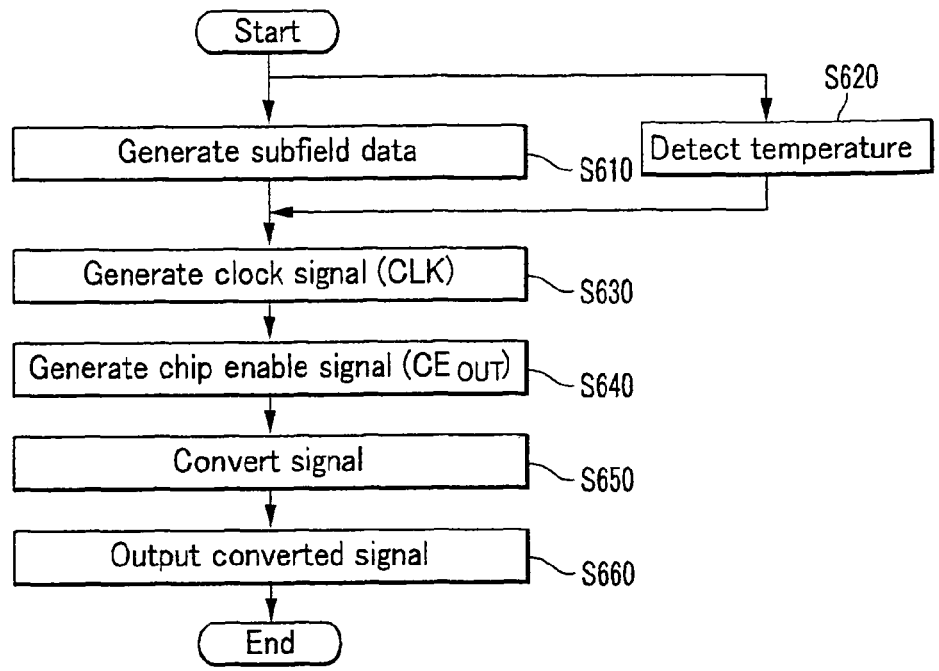
FIG. 6 is a flowchart of the controller of FIG. 5.
Figure 7:
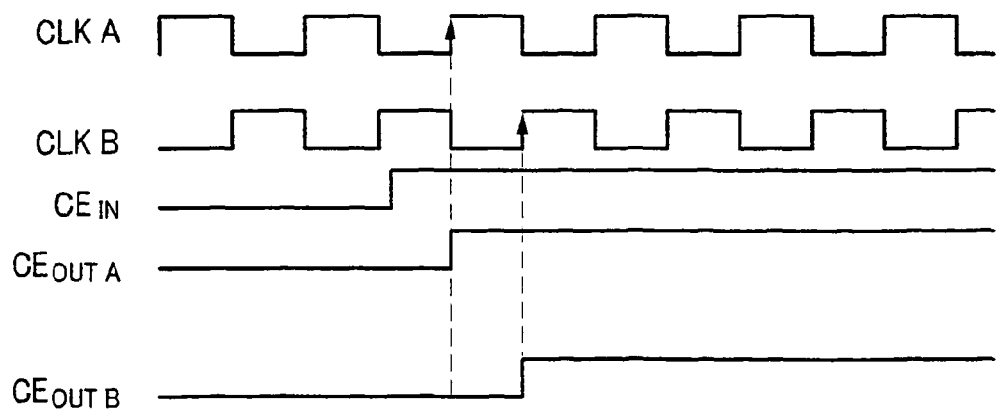
FIG. 7 is a waveform diagram of a method of generating a clock signal in a clock signal generator of FIG. 5.
Figure 8:
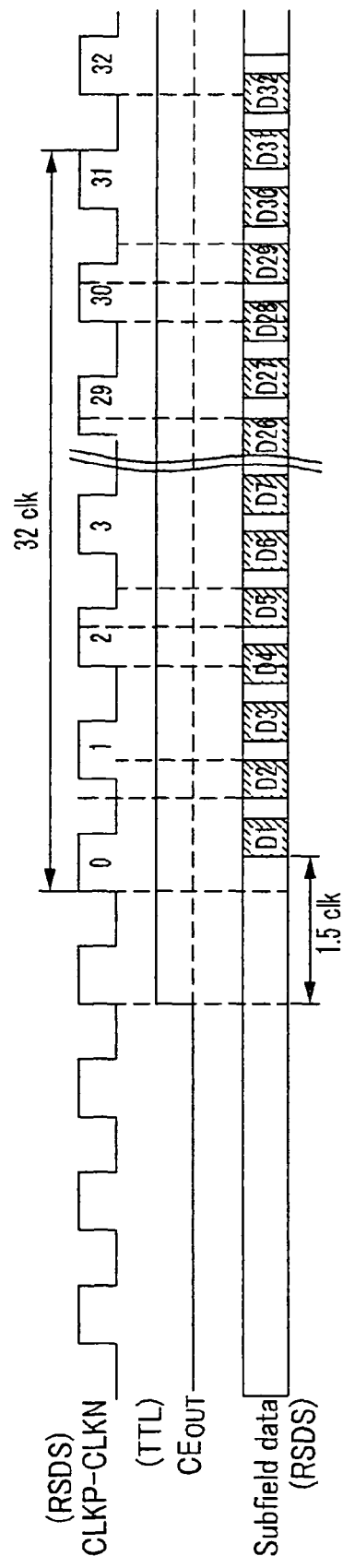
FIG. 8 is a waveform diagram of a method of outputting subfield data from a signal output unit of FIG. 5.

FIG. 5 is a block diagram of a controller 510 according to the exemplary embodiment of the present invention. The controller 510 of FIG. 5 may be included in the controlling board 500. FIG. 6 is a flowchart of an operation of the controller 510 of FIG. 5. FIG. 7 is a waveform diagram of a method of generating a clock signal in a clock signal generator 513 of FIG. 5. FIG. 8 is a waveform diagram of a method of outputting the subfield data from a signal output unit 515 of FIG. 5.

As shown in FIG. 5, the controller 510 includes a subfield data generator 511, a temperature detector 512, a clock signal generator 513, a signal controller 514, and a signal output unit 515.

The subfield data generator 511 generates subfield data using input video signals during one frame and outputs the subfield data to the signal controller 514, in step S610. At this point, the subfield data indicates respective light emitting/non-light emitting states of the plurality of discharge cells in the plurality of subfields of one frame.

The temperature detector 512 detects a temperature of the plasma display (i.e., a temperature of the address buffer board 100) and outputs the detected temperature to the clock signal generator 513, in step S620.

The clock signal generator 513 receives a clock signal CLK' and generates a clock signal CLK according to the temperature of the plasma display output from the temperature detector 512 and transmits the clock signal CLK to the signal controller 514 in step S630. When the clock signal CLK is generated, the buffer delay value of the TTL signal is considered. In further detail, since the buffer delay value of the TTL signal is reduced when the temperature is low, the clock signal generator 513 generates the clock signal CLK quickly when the temperature of the plasma display is decreased. For example, as shown in FIG. 7, the clock signal generator 513 can generate a clock signal CLK A when the temperature of the plasma display is low earlier than a clock signal CLK B when the temperature of the plasma display is high.

The signal controller 514 synchronizes an input chip enable signal CEIN to a selected clock signal CLK to generate a chip enable signal $CE_{OUT}$ in step S640, and converts the chip enable signal $CE_{OUT}$ into a TTL signal and outputs the converted signal to the signal output unit 515 in step S650. That is, as shown in FIG. 7, when the clock signal generator 513 generates the clock signal CLK A at the low temperature earlier than the clock signal CLK B at the high temperature, a chip enable signal $CE_{OUTA}$ for the clock signal CLKA that corresponds to the low temperature is generated and output earlier than a chip enable signal $CE_{OUTB}$ for the clock signal CLKB that corresponds to the low temperature.

In addition, the signal controller 514 converts the subfield data output from the subfield data generator 511 and the clock signal CLK' into differential signals, respectively and outputs the converted signals to the signal output unit 515, in step S650.

The signal output unit 515 outputs the subfield data output from the subfield data generator 511 to the A driving integrated circuit (111 of FIG. 2) in synchronism with the chip enable signal $CE_{OUT}$ of the TTL signal and the clock signal CLKP-CLKN converted into a differential signal, in step S660. That is, as shown in FIG. 8, the chip enable signal $CE_{OUT}$ is recognized as a high level signal at a rising edge of the clock signal CLKP-CLKN, the first subfield data D1 is output after a predetermined number of clock signals (1.5 clks in FIG. 8) from the rising edge of the clock signal CLKP-CLKN, and 32 subfield data D1 to D32 are output during 32 clks. In addition, the signal output unit 515 outputs the clock signal CLKP-CLKN to the A driving integrated circuit (111 of FIG. 2), and outputs the chip enable signal $CE_{OUT}$ to the buffer (112 of FIG. 2) in the address buffer board (110 of FIG. 3), in step S660.

As described, according to the exemplary embodiment of the present invention, the clock signal generator 513 normally generates a clock signal that corresponds to a high temperature earlier than a clock signal that corresponds to a low temperature, and therefore a chip enable signal for the clock signal that corresponds to the low temperature is generated and output earlier than a chip enable signal for the clock signal that corresponds to the high temperature. Accordingly, subfield data corresponding to the clock signal and the chip enable signal that correspond to the low temperature is output earlier than subfield data corresponding to the clock signal and the chip enable signal that correspond to the high temperature. Therefore, although a control signal such as a chip enable signal, transmitted as a TTL signal, has a different delay value according to temperature in the buffer of the address buffer board, the clock signal generator compensates for the different delay value to thereby prevent data from being mismatched.

In addition, according to the exemplary embodiment of the present invention, output timing of subfield data from the signal output unit 515 to the A driving integrated circuits disposed in the upper and lower portions can be synchronized when the clock signal generator 513 generates a clock signal in consideration of the length of a path between the address buffer boards disposed in the upper and lower portions if the plasma display is driven by the dual driving method.

According to the exemplary embodiment of the present invention, although a delay value varies depending on temperature in the buffer that receives and outputs a control signal transmitted as a TTL signal, the varying delay value can be compensated for when a clock signal is generated to thereby prevent data from being mismatched.

While this invention has been described in connection with what is presently considered to be practical exemplary embodiments, it is to be understood that the present invention is not limited to the disclosed embodiments, but, on the contrary, is intended to cover various modifications and equivalent arrangements included within the spirit and scope of the appended claims.

What is claimed is:
1. A plasma display comprising:
an address electrode;
an address driving circuit connected to the address electrode;

a buffer connected to the address driving circuit and having a delay value corresponding to a temperature of the plasma display; and a controller outputting a second clock signal in which a first clock signal is delayed for a predetermined time, generating a control signal using the second clock signal, outputting the control signal to the address driving circuit through the buffer, and outputting a subfield data corresponding to a video data input during a frame and the first clock signal to the address driving circuit, wherein the address driving circuit applies a driving voltage corresponding to the subfield data using the first clock signal and the control signal to the address electrode.

2. The plasma display of claim 1, wherein the buffer decreases its delay value in response to a decrease in the temperature, and wherein the controller decreases the predetermined time in response to a decrease in the temperature.

3. The plasma display of claim 2, wherein the controller comprises:

a subfield data generator dividing one frame into a plurality of subfields, and converting the image data into subfield data corresponding to the plurality of subfields;

a temperature detector detecting a temperature of the address buffer board;

a clock signal generator generating the second clock signal in which the first clock signal delayed for the predetermined time in consideration of the delay value of the buffer according to the detected temperature, and outputting the second clock signal;

a signal controller generating the control signal from the second clock signal; and a signal output unit outputting the subfield data to the address driving circuit by the first clock signal and the control signal, outputting the first clock signal to the address driving circuit, and outputting the control signal to the buffer.

4. The plasma display of claim 3, wherein the signal controller converts the control signal into a Transistor-Transistor Logic (TTL) signal and outputs the TTL signal to the signal output unit, and converts the first clock signal and the subfield data into differential signals, respectively and outputs the conversion result to the signal output unit.

5. The plasma display of claim 4, wherein the signal controller outputs each differential signal as a Reduced Swing Differential Signaling (RSDS) signal.

6. The plasma display of claim 2, wherein the address driving circuit comprises an Integrated Circuit (IC).

7. The plasma display of claim 6, wherein the address driving circuit is arranged on a packaging connection member and the packaging connection member includes a Tape Carrier Package (TCP).

8. A method of driving a plasma display having a driving integrated circuit connected to a plurality of electrodes, the method comprising:

generating subfield data using image data input a frame;

generating a second clock signal in which a first clock signal is delayed for a predetermined time corresponding to a temperature of the plasma display, and outputting the second clock signal;

generating a control signal using the second clock signal;

outputting the control signal to the driving integrated circuit through a buffer having a delay value corresponding to the temperature of the plasma display; and outputting the subfield data to the driving integrated circuit using the control signal and the first clock signal.

9. The method of claim 8, wherein the predetermined time is increased in response to the delay value of the buffer being increased, and wherein the delay value of the buffer is increased in response to the temperature of the plasma display being increased.

10. The method of claim 9, wherein the outputting of the subfield data to the driving integrated circuit comprises:

converting the first clock signal into a differential signal;

converting the subfield data into a differential signal;

converting the control signal into a Transistor-Transistor Logic (TTL) signal; and outputting the subfield data converted to the differential signal using the control signal converted to the TTL signal to the driving integrated circuit.

11. The method of claim 10, wherein the differential signal is prevented from passing through the buffer.

12. The method of claim 9, wherein the driving integrated circuit is arranged on a packaging connection member, and the packaging connection member comprises a Tape Carrier Package (TCP).

13. The method of claim 12, wherein the packaging connection member is arranged between the plurality of electrodes and an address buffer board, and wherein the buffer is arranged in the address buffer board.

* * * * *